(12) United States Patent
Ku et al.

(10) Patent No.: US 8,243,748 B2
(45) Date of Patent: Aug. 14, 2012

(54) CHANNEL UTILIZING METHOD AND SYSTEM FOR WIRELESS NETWORKS

(75) Inventors: Chia-Yu Ku, Miaoli County (TW); Ying-Dar Lin, Taipei (TW); Shau-Yu Cheng, Jhubei (TW)

(73) Assignee: Realtek Semiconductor Corp., Hsinchu (TW)

( * ) Notice: Subject to any disclaimer, the term of this patent is extended or adjusted under 35 U.S.C. 154(b) by 614 days.

(21) Appl. No.: 12/466,659

(22) Filed: May 15, 2009

(65) Prior Publication Data

US 2009/0290551 A1    Nov. 26, 2009

(30) Foreign Application Priority Data

May 21, 2008    (TW) ............................... 97118671 A

(51) Int. Cl.
*H04J 3/16* (2006.01)
(52) U.S. Cl. ......... 370/437; 370/447; 370/461; 370/462
(58) Field of Classification Search .................. None
See application file for complete search history.

(56) References Cited

U.S. PATENT DOCUMENTS

| | | | | |
|---|---|---|---|---|
| 2007/0105552 A1* | 5/2007 | Hun et al. | ...................... | 455/434 |
| 2007/0217377 A1* | 9/2007 | Takeuchi | ...................... | 370/338 |
| 2007/0266134 A1* | 11/2007 | Shyy et al. | ...................... | 709/223 |
| 2007/0274256 A1* | 11/2007 | Murai et al. | ................... | 370/328 |
| 2008/0076466 A1* | 3/2008 | Larsson | ......................... | 455/522 |
| 2008/0144493 A1* | 6/2008 | Yeh | ................................ | 370/230 |
| 2008/0144584 A1* | 6/2008 | Sugaya | ........................... | 370/336 |
| 2008/0171550 A1* | 7/2008 | Zhao | ............................... | 455/445 |
| 2008/0232309 A1* | 9/2008 | McNew et al. | ................ | 370/329 |
| 2008/0285524 A1* | 11/2008 | Yokoyama | ..................... | 370/336 |
| 2011/0200019 A1* | 8/2011 | Manbo et al. | .................. | 370/336 |

OTHER PUBLICATIONS

Paramvir Bahl, et al., "SSCH: Slotted Seeded Channel Hopping for Capacity Improvement in IEEE 802.11 Ad-Hoc Wireless Networks," MobiCom '04, Philadelphia, Pennsylvania, pp. 216-230, Sep. 26-Oct. 1, 2004.

Ranveer Chandra, et al., "MultiNet: Connecting to Multiple IEEE 802.11 Networks Using a Single Wireless Card," IEEE, pp. 882-893, 2004.

Nitin Jain, et al., "A Multichannel CSMA MAC Protocol with Receiver-Based Channel Selection for Multihop Woreless Networks," pp. 432-439, 2001.

Asis Nasipuri, et al., "A Multichannel CSMA MAC Protocol for Multihop Wireless Networks," IEEE, pp. 1402-1406, 1999.

(Continued)

*Primary Examiner* — Andrew Chriss
*Assistant Examiner* — Roberta A Shand
(74) *Attorney, Agent, or Firm* — Thomas, Kayden, Horstemeyer & Risley, LLP

(57) ABSTRACT

A channel utilizing method for a wireless network is adapted for channel utilization by a switch node having a number (N) of transceivers in an environment with a number (M) of channels, wherein (N)<(M). The channel utilizing method includes the steps of: calculating a channel weight set, and selecting one of the (M) channels according to the channel weight set; determining a notify mechanism according to a relation between the switch node and a neighbor node; using the notify mechanism to notify the neighbor node of a current state of the switch node; and calculating a channel stay-in period, and causing the switch node to stay in the selected one of the channels for a duration of the channel stay-in period. A channel utilizing system is also disclosed.

20 Claims, 4 Drawing Sheets

OTHER PUBLICATIONS

Asis Nasipuri, "Multichannel CSMA with Signal Power-Based Channel Selection for Multihop Wireless Networks," IEEE, pp. 211-218, 2000.

Jungmin So and Nitin Vaidya, "Multi-Channel MAC for Ad Hoc Networks: Handling Multi-Channel Hidden Terminals Using a Single Transceiver," MobiHoc '04, Roppongi, Japan, pp. 222-233, May 24-26, 2004.

Shih-Lin Wu, et al., "A New Multi-Channel MAC Protocol with On-Demand Channel Assignment for Multi-Hop Mobile Ad Hoc Networks," IEEE, pp. 232-237, 2000.

Shih-Lin Wu, et al., "A Multi-channel MAC Protocol with Power Control for Multi-hop Mobile Ad Hoc Networks," The Computer Journal, vol. 45, No. 1, pp. 101-110, 2002.

Chia-Yu Ku and Dr. Ying-Dar Lin; "Utilizing Multi-Channel with Less Radios in the IEEE 802.11s Mesh Networks" A Thesis Submitted to Institutes of Computer Science National Chiao Tung University in partial Fulfillment of the Requirements for the Degree of Master in Computer Science and Engineering, Jun. 2007, HsinChu, Taiwan, Rupublic of China.

* cited by examiner

CHANNEL UTILIZING METHOD AND SYSTEM FOR WIRELESS NETWORKS

CROSS-REFERENCE TO RELATED APPLICATION

This application claims priority of Taiwanese application no. 097118671, filed on May 21, 2008.

BACKGROUND OF THE INVENTION

1. Field of the Invention

The invention relates to wireless network technology, more particularly to a channel utilizing method and system for wireless networks.

2. Description of the Related Art

Compared to conventional wired networks, a wireless network is easier and quicker to establish. IEEE 802.11 is a communications protocol standard for wireless local area networks (WLAN).

In a basic service set (BSS) of a fundamental infrastructure of an IEEE 802.11 wireless network, a station (STA) has to go through an access point (AP) to access the Internet. The basic service set (BSS) of each fundamental infrastructure only needs a single channel for all stations to communicate with the access point.

However, in an IEEE 802.11s mesh network, there are two types of traffic loads, namely a BSS traffic load and a mesh transfer traffic load. It is noted that carrier sensing in the BSS traffic load may affect processing of the mesh transfer traffic load. While the use of multiple channels is an instinctive solution to this problem, multiple transceivers are required. In view of cost and power consumption considerations, it is desirable to use fewer transceivers (i.e., number of transceivers<number of channels) during implementation. Under this situation, transceivers have to be switched among the channels, which can result in packet loss and connection interruptions.

Hence, it is highly desired to lower the probability of packet loss and connection interruptions and reduce waste of channel time while using as few transceivers as possible.

SUMMARY OF THE INVENTION

Therefore, an object of the present invention is to provide a channel utilizing method for wireless networks.

According to one aspect of the invention, there is provided a channel utilizing method for a wireless network. The channel utilizing method is adapted for channel utilization by a switch node having a number (N) of transceivers in an environment with a number (M) of channels, wherein (N)<(M). The channel utilizing method comprises the steps of:

calculating a channel weight set, and selecting one of the (M) channels according to the channel weight set;

determining a notify mechanism according to a relation between the switch node and a neighbor node;

using the notify mechanism to notify the neighbor node of a current state of the switch node; and calculating a channel stay-in period, and causing the switch node to stay in the selected one of the channels for a duration of the channel stay-in period.

Another object of the present invention is to provide a channel utilizing system for wireless networks.

According to another aspect of the invention, there is provided a channel utilizing system for a wireless network. The channel utilizing system is adapted for channel selection by a wireless network device having a number (N) of transceivers in an environment with a number (M) of channels, wherein (N)<(M). The channel utilizing system comprises a calculating unit, a channel selecting unit, a notify mechanism processing unit, and a control unit. The calculating unit calculates a channel weight set and a channel stay-in period. The channel selecting unit selects one of the (M) channels according to the channel weight set. The notify mechanism processing unit includes a notify mechanism selecting module and a notifying module. The notify mechanism selecting module selects a notify mechanism according to a relation between the wireless network device and a second wireless network device. The notifying module uses the notify mechanism to notify the second wireless network device of a current state of the wireless network device. The control unit controls the time the wireless network device stays in the selected one of the channels according to the channel stay-in period.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
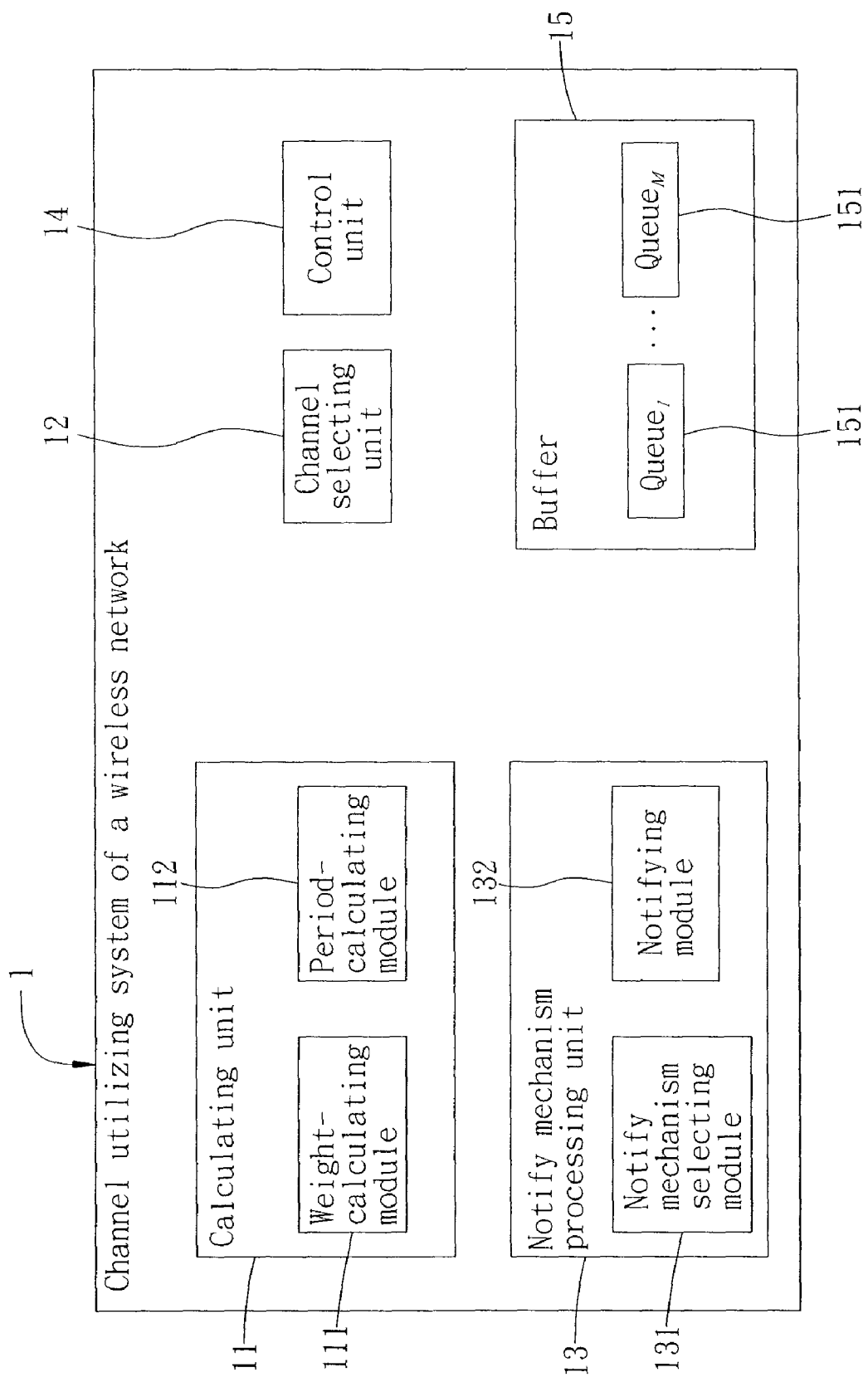
FIG. 1 is a system block diagram of the preferred embodiment of a channel utilizing system according to the present invention.
Figure 2:
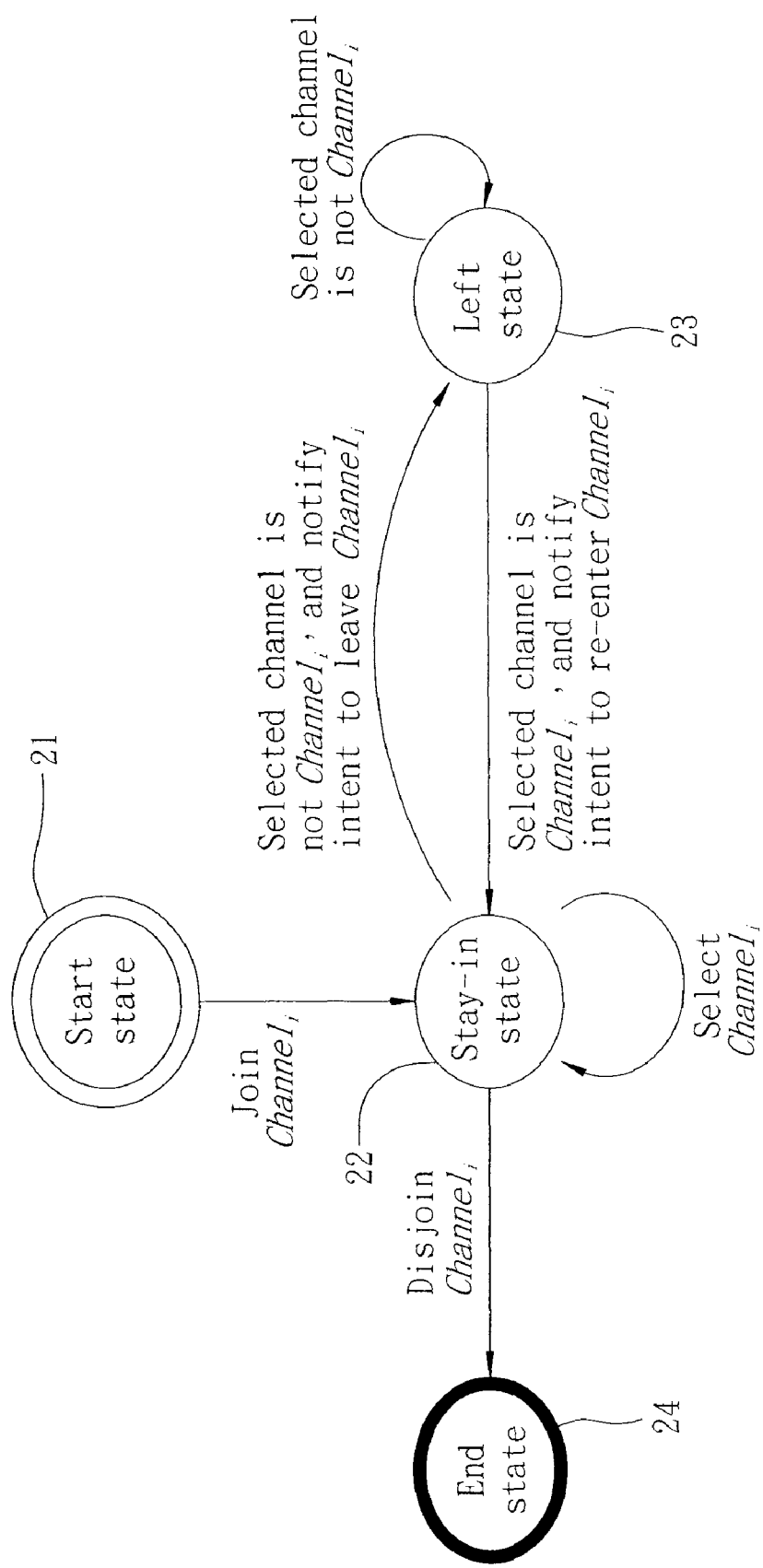
FIG. 2 is a state transition diagram showing possible current states of a switch node.
Figure 3:
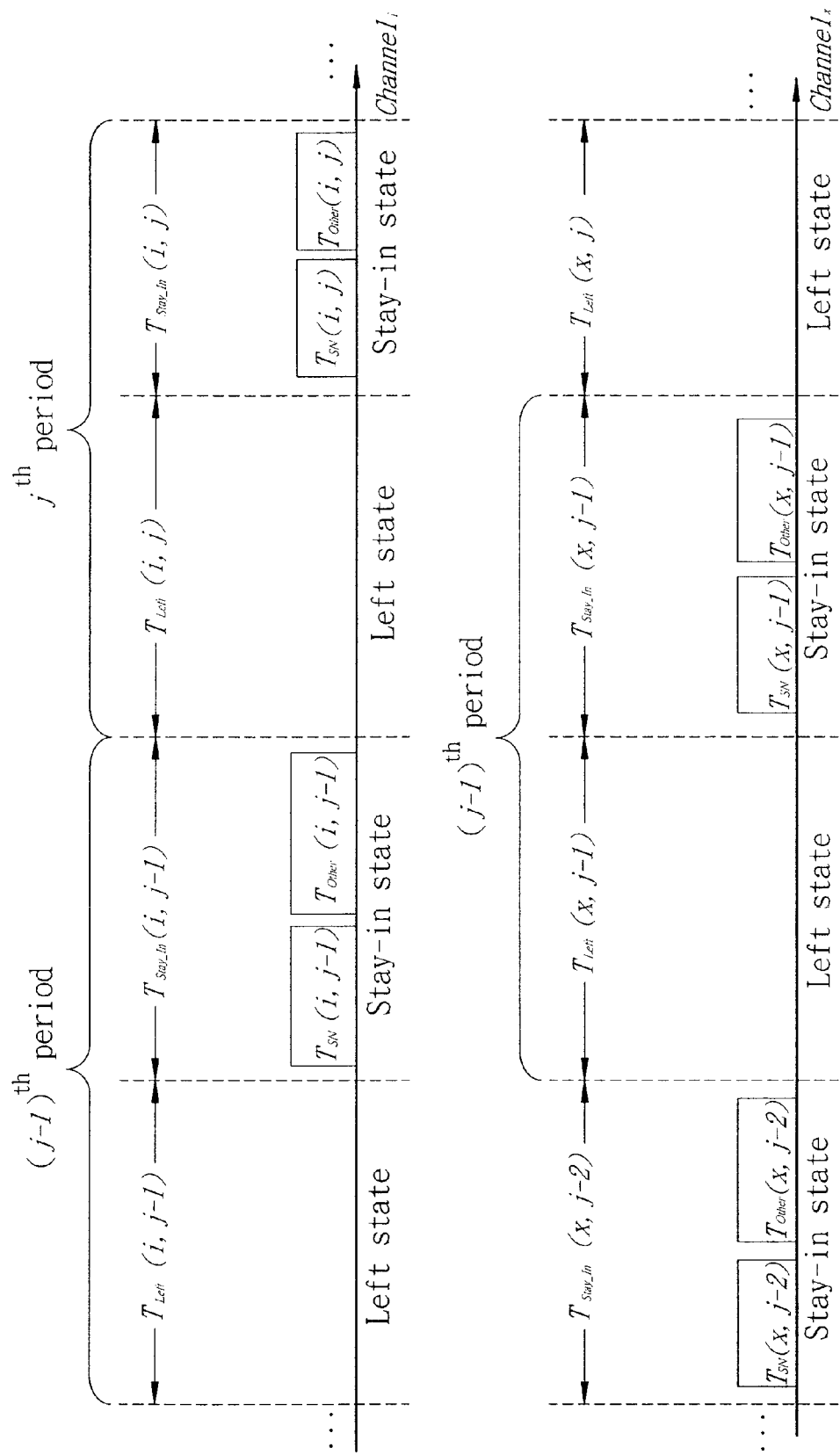
FIG. 3 is a time chart for illustrating state changes of a transceiver that switches among a plurality of channels.

Referring to FIGS. 1, 2 and 3, the preferred embodiment of a channel utilizing system 1 for a wireless network according to the present invention is shown to be adapted for channel selection by a switch node having a number (N) of transceivers in an environment with a number (M) of channels, wherein (N)<(M). In this embodiment, the switch node is a wireless network device, and the transceivers are switched among the channels. The switch node corresponds to at least one neighbor node, which is also a wireless network device. The channel utilizing system 1 comprises a calculating unit 11, a channel selecting unit 12, a notify mechanism processing unit 13, a control unit 14, and a buffer 15. In this embodiment, the system 1 is applied to an IEEE 802.11 wireless network, and is realized in the form of a driver in a media access control (MAC) layer of the switch node.

Each of the (M) channels is represented by $Channel_i$, where ($i \leq M$). A current state of the switch node at the $Channel_i$ changes among a start state 21, a stay-in state 22, a left state 23, and an end state 24. The start state 21 indicates that the switch node does not have sufficient transceivers to join the $Channel_i$ or does not consider joining the $Channel_i$. When the switch node joins the $Channel_i$, the current state is switched from the start state 21 to the stay-in state 22. After the switch node stays in the stay-in state 22 for a channel stay-in period, if the next channel to be selected is the $Channel_i$, the switch node remains in the stay-in state 22. Otherwise, the switch node is switched from the stay-in state 22 to the left state 23. After the switch node stays in the left state 23 for a channel left period, if the next channel to be selected is not the $Channel_i$, the switch node remains in the left state 23. Otherwise, the switch node re-enters the stay-in state 22. When the switch node disjoins the $Channel_i$, the current state is switched from the stay-in state 22 to the end state 24.

The calculating unit 11 calculates a channel weight set and the channel stay-in period using a Time Ratio Aware Switching Superintendent (TRASS) algorithm. The channel weight set includes a plurality of channel weights, the number of which is equal to the number of channels that are available for selection and switching. Each of the channel weights corresponds to a respective one of the channels. The channel selecting unit 12 selects one of the (M) channels according to the channel weight set. The notify mechanism processing unit 13 is for selecting a suitable notify mechanism, and uses the selected notify mechanism to make a neighbor node corresponding to the switch node aware of the current state of the switch node. The control unit 14 controls the processing flow of the system 1 (such as switching of the current state of the switch node), and determines whether data to be transmitted by the switch node is to be directly transmitted or is to be stored first in the buffer 15. The buffer 15 includes a plurality of queues 151, each of which is represented by Queue$_i$, where (i≦M). The number of queues 151 is equal to the number of channels that are available for selection and switching. Each of the queues 151 corresponds to a respective one of the channels. If the current state of the switch node at the Channel$_i$ is the stay-in state 22, and the destination of data that is to be transmitted is not in the Channel$_i$, the data is first stored in the Queue$_i$ of the buffer 15, which corresponds to the Channel$_i$.

The calculating unit 11 includes a weight-calculating module 111 for calculating the channel weighting set, and a period-calculating module 112 for calculating the channel stay-in period. Details of the TRASS algorithm used by the calculating unit 11 are as follows. The definitions of all variables used in the TRASS algorithm are listed below:

∀ Channel$_i$:

$T_{SN}(i,j)$ is a switch node occupied time, which represents an amount of time Channel$_i$ was occupied by the switch node during the $j^{th}$ period.

$T_{other}(i,j)$ is an other node occupied time, which represents an amount of time Channel$_i$ was occupied by nodes other than the switch node during the $j^{th}$ period.

$T_{stay\_In}(i,j)$ represents the channel stay-in period for the $j^{th}$ period, i.e., for Channel$_i$, the time the switch node continuously remains in the stay-in state 22 during the $j^{th}$ period.

$T_{Left}(i,j)$ represents the channel left period for the $j^{th}$ period, i.e., for Channel$_i$, the time the switch node continuously remains in the left state 23 during the $j^{th}$ period.

$D_{Buffered}(i,j)$ represents an amount of data left in Queue$_i$ of the buffer 15 at the end of the $j^{th}$ period.

$D_{Done}(i,j)$ represents an amount of data transmitted by the switch node during the $j^{th}$ period. If $D_{Done}(i,j)$ is equal to 0, the value thereof is set to a minimum frame size.

Weight$_i$ represents a weight corresponding to the Channel$_i$.

$\alpha_i$ represents an aging rate of the Channel$_i$, which has a value that can be adjusted according to different conditions of the Channel$_i$.

$\beta_i$ represents a channel utilization rate of the Channel$_i$, which has a predefined value.

$\gamma_i$ represents an adjustable affect ratio, where $0 \leq \gamma_i \leq 1$.

MinTime represents a time required for completing a basic operation.

$$Weight_i = \left[ (1-\gamma_i) \times \left( \frac{\sum_{k=1}^{j-2} T_{SN}(i,k)}{\sum_{k=1}^{j-2} T_{Stay\_In}(i,k)} \right) + \gamma_i \times \frac{T_{SN}(i,j-1)}{T_{Stay\_In}(i,j-1)} \right] \times \tag{1}$$

$$\left( 1 + \frac{D_{Buffered}(i,j-1)}{D_{Done}(i,j-1)} \right) + T_{Left}(i,j) \times \alpha_i$$

In Equation (1), Weight$_i$ reflects an extent of traffic in the Channel$_i$ and the time the switch node stays in the left state 23 (i.e., $T_{Left}(i,j)$). Before the $j^{th}$ period, if the time the switch node occupied the Channel$_i$ is relatively long, and the amount of data left in Queue$_i$ of the buffer 15 is relatively large, this indicates that the extent of traffic in the Channel$_i$ is relatively heavy. If the extent of traffic in the Channel$_i$ is relatively heavy, and the time the switch node stays in the left state 23 is relatively long, the corresponding Weight$_i$ will be relatively large, and the probability that the Channel$_i$ will be selected will be higher.

$$T_{SN}(i,j) = \left[ (1-\gamma_i) \times \left( \frac{\sum_{k=1}^{j-2} T_{SN}(i,k)}{\sum_{k=1}^{j-2} T_{Left}(i,k)} \right) + \gamma_i \times \frac{T_{SN}(i,j-1)}{T_{Left}(i,j-1)} \right] \times \tag{2}$$

$$T_{Left}(i,j) \times \left( 1 + \frac{D_{Buffered}(i,j-1)}{D_{Done}(i,j-1)} \right)$$

$$T_{Other}(i,j) = \left[ (1-\gamma_i) \times \left( \frac{\sum_{k=1}^{j-2} T_{SN}(i,k)}{\sum_{k=1}^{j-2} T_{Stay\_In}(i,k)} \right) + \gamma_i \times \frac{T_{Other}(i,j-1)}{T_{Stay\_In}(i,j-1)} \right] \times$$

$$T_{Stay\_In}(i,j)$$

$$\frac{T_{SN}(i,j) + T_{Other}(i,j)}{T_{Stay\_In}(i,j)} = \beta_i$$

In Equation (2), $$\frac{T_{SN}(i,j) + T_{Other}(i,j)}{T_{Stay\_In}(i,j)}$$

can be deemed as a total traffic load ratio.

From Equation (2), $T_{stay\_In}(i,j)$ can be inferred as shown in Equation (3). For the sake of simplicity, let $$\frac{T'_{Other}(i,j-1)}{T'_{Stay\_In}(i,j-1)} = \left[ (1-\gamma_i) \times \left( \frac{\sum_{k=1}^{j-1} T_{Other}(i,k)}{\sum_{k=1}^{j-2} T_{Stay\_In}(i,k)} \right) + \tag{3}$$

$$\gamma_i \times \frac{T_{Other}(i,j-1)}{T_{Stay\_In}(i,j-1)} \right]$$

$$T_{Stay\_In}(i,j) = \frac{T_{SN}(i,j)}{\beta_i - \frac{T'_{Other}(i,j-1)}{T'_{Stay\_In}(i,j-1)}}$$

There are several special cases for the values of $T_{stay\_In}(i,j)$: case a), $T_{stay\_In}(i,j)$<MinTime; case b), the traffic load of Channel$_i$ is heavy and the appropriate channel utilization rate cannot be achieved, i.e., $$\frac{T_{Other}(i,j-1)}{T_{Stay\_In}(i,j-1)} \geq \beta_i;$$

and case c), the previous total traffic load ratio is larger than the channel utilization rate, i.e., $$\frac{T_{SN}(i, j-2) + T_{Other}(i, j-2)}{T_{Stay\_In}(i, j)} \geq \beta_i, \text{ and}$$

$$\frac{T_{SN}(i, j-1) + T_{Other}(i, j-1)}{T_{Stay\_In}(i, j-1)} \geq \beta_i.$$

Hence, the Equation for $T_{Stay\_In}$ (i,j) can be summarized as shown in Equation (4).

$$T_{Stay\_In}(i, j) = \begin{cases} MinTime, & \text{if case } a \\ T_{Stay\_In}(i, j-1), & \text{if case } b \\ T_{Stay\_In}(i, j-1), & \text{if case } c \\ \dfrac{T_{SN}(i, j)}{\beta_i - \dfrac{T_{Other}(i, j-1)}{T_{Stay\_In}(i, j-1)}} & \text{if other than case } a, b \text{ and } c \end{cases} \quad (4)$$

The notify mechanism processing unit 13 includes a notify mechanism selecting module 131 and a notifying module 132. The notify mechanism selecting module 131 selects a suitable notify mechanism according to a relation between the switch node and the corresponding neighbor node. The notifying module 132 uses the selected notify mechanism to notify the neighbor node corresponding to the switch node of the current state of the switch node. The notify mechanism can be one of three types, which are detailed below:

The first type: When the relation between the switch node and the corresponding neighbor node is such that the switch node and the corresponding neighbor node are included in a mesh network, and the switch node is a mesh point (MP) and supports a power-saving mechanism, the notify mechanism is determined to be the power-saving mechanism. In practice, the switch node enters a power-saving mode and sends out a beacon for the corresponding neighbor node, wherein a power management (PM) bit of the beacon is set to 1, so that the neighbor node is notified that the switch node intends to leave the Channel$_i$ (i.e., the current state of the switch node is switched from the stay-in state 22 to the left state 23). On the other hand, the switch node leaves the power-saving mode and sends out a beacon for the corresponding neighbor node, wherein the power management (PM) bit of the beacon is set to 0, so that the neighbor node is notified that the switch node intends to re-enter the Channel$_i$ (i.e., the current state of the switch node is switched from the left state 23 to the stay-in state 22).

The second type: When the relation between the switch node and the corresponding neighbor node is such that the switch node and the corresponding neighbor node are included in a basic service set (BSS) of a fundamental infrastructure of the wireless network, and the switch node is an access point (AP) and supports a hybrid coordination function (HCF) controlled channel access (HCCA) mechanism, the notify mechanism is determined to be the HCCA mechanism. In practice, the switch node enters a contention free period (CFP) and sends out a beacon for the corresponding neighbor node, wherein a contention free (CF) parameter of the beacon is set, so that the neighbor node is notified that the switch node intends to leave the Channel$_i$ (i.e., the current state of the switch node is switched from the stay-in state 22 to the left state 23). On the other hand, the switch node sends out a CF-END so that the neighbor node is notified that the switch node intends to re-enter the Channel$_i$ (i.e., the current state of the switch node is switched from the left state 23 to the stay-in state 22).

The third type: When the relation between the switch node and the corresponding neighbor node is such that the switch node and the neighbor node are included in a mesh network, and the switch node does not support a power-saving mechanism, or such that the switch node and the corresponding neighbor node are included in a basic service set (BSS) of a fundamental infrastructure of the wireless network, and the switch node does not support a HCCA mechanism, the notify mechanism is determined to be a clear to send (CTS)-to-self mechanism. In practice, the switch node sends out a CTS-to-self data frame and updates a network allocation vector (NAV). Media access of the Channel$_i$ is thus bounded, and the switch node can safely leave the Channel$_i$ (i.e., the current state of the switch node is switched from the stay-in state 22 to the left state 23). On the other hand, the switch node resets the NAV to release Channel$_i$, and re-enters the Channel$_i$ (i.e., the current state of the switch node is switched from the left state 23 to the stay-in state 22).

Figure 4:
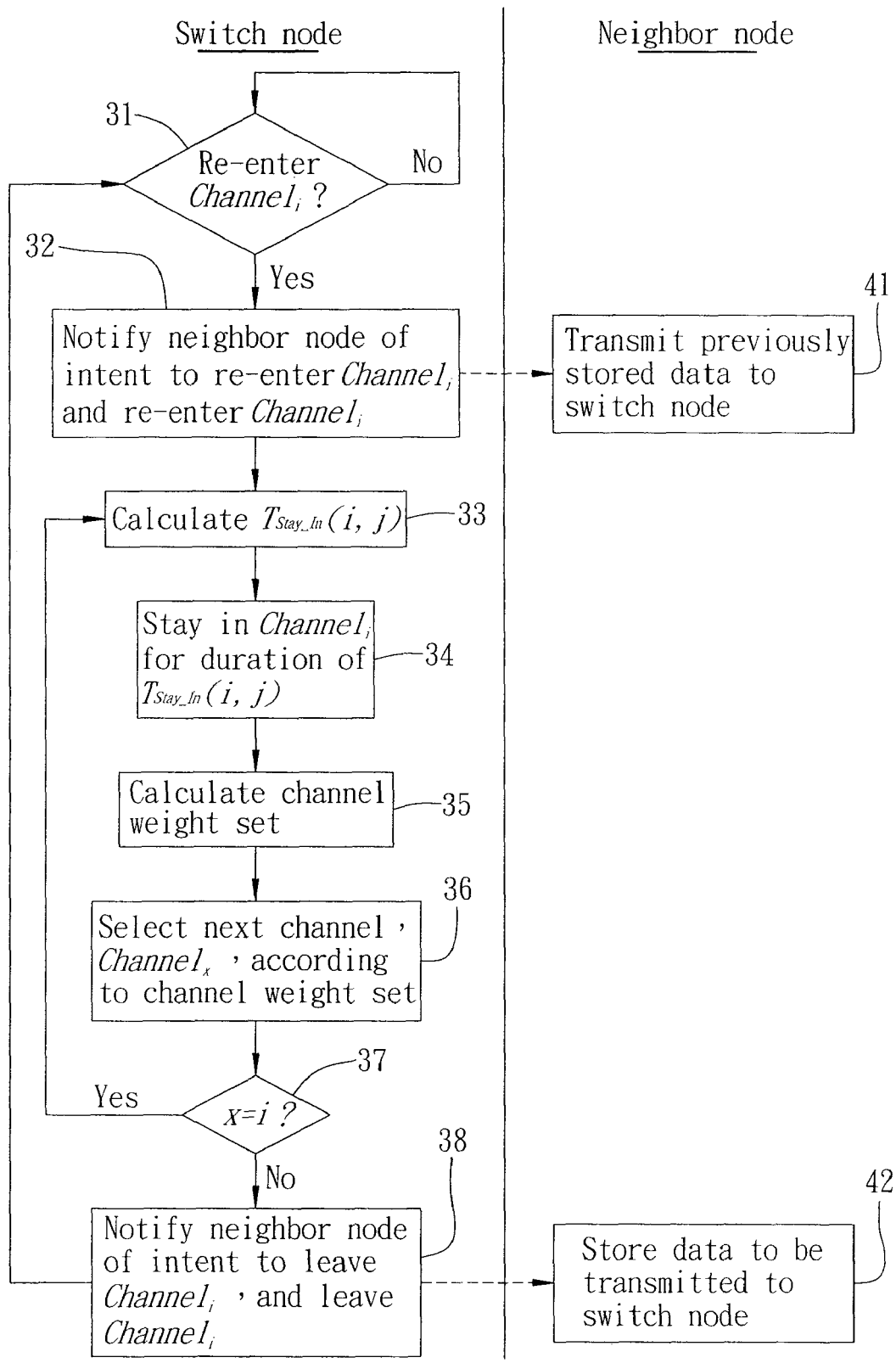
FIG. 4 is a flowchart of the preferred embodiment of a channel utilizing method according to the present invention.

Referring to FIGS. 1, 2 and 4, the preferred embodiment of a channel utilizing method according to the present invention is for using fewer transceivers over a plurality of channels in an IEEE 802.11 wireless network and comprises the following steps. The steps of the method are mainly directed to switching between the stay-in state 22 and the left state 23.

In step 31, the weight-calculating module 111 of the calculating unit 11 calculates the channel weight set according to Equation (1), and the channel selecting unit 12 determines whether to select Channel$_i$ and re-enter the Channel$_i$ (i.e., whether the current state of the switch node is to be switched from the left state 23 to the stay-in state 22) according to each of the channel weights in the channel weight set. In the affirmative, the flow goes to step 32. Otherwise, the current state of the switch node remains in the stay-in state 22. When the channel weight Weight$_i$ corresponding to the Channel$_i$ is the largest, Channel$_i$ is selected and re-entered.

In step 32, the notify mechanism selecting module 131 of the notify mechanism processing unit 13 selects a notify mechanism according to a relation between the switch node and the corresponding neighbor node. Next, the notifying module 132 uses the selected notify mechanism to notify the neighbor node that the switch node intends to re-enter the Channel$_i$. Then, the switch node re-enters the Channel$_i$. At this time, the current state of the switch mode is the stay-in state 22. As shown in step 41, when the neighbor node is notified that the switch node has re-entered the Channel$_i$, transmission of previously stored data to the switch node begins.

In steps 33 and 34, the period-calculating module 112 of the calculating unit 11 calculates the channel stay-in period $T_{Stay\_In}$(i,j) according to Equations (2) and (4), and the switch node stays in the Channel$_i$ for the duration of $T_{Stay\_In}$(i,j). At this moment, the control unit 14 determines whether the data to be transmitted by the switch node is to be directly transmitted or is to be first stored in the buffer 15 according to whether or not the destination of the data to be transmitted is in the Channel$_i$.

In steps 35 to 37, after the switch node has stayed in the Channel$_i$ for the duration of $T_{Stay_{In}}$(i, j), the weight-calculating module 111 recalculates the channel weight set, and the channel selecting unit 12 selects a next channel, Channel$_x$, according to each weight in the channel weight set. If Channel$_i$ is selected (i.e., x=i), the flow goes back to step 33. Otherwise, the flow proceeds to step 38.

In step 38, the notifying module 132 uses the selected notify mechanism to notify the neighbor node that the switch node intends to leave the Channel$_i$, and the switch node leaves the Channel$_i$. At this time, the current state of the switch node is the left state 23. Then, as shown in step 42, when the neighbor node is notified that the switch node has left the Channel$_i$, the neighbor node starts to store the data to be transmitted to the switch node.

In summary, the present invention selects a suitable notify mechanism, and uses a TRASS algorithm to obtain an optimum channel stay-in period. Accordingly, the probabilities of packet loss and connection interruptions can be lowered, and waste of channel time can be reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A channel utilizing method for a wireless network, said channel utilizing method being adapted for channel utilization by a switch node having a number (N) of transceivers in an environment with a number (M) of channels, wherein (N)<(M), said channel utilizing method comprising the steps of: calculating a channel weight set, and selecting one of the (M) channels according to the channel weight set; determining a notify mechanism according to a relation between the switch node and a neighbor node; using the notify mechanism to notify the neighbor node of a current state of the switch node; and calculating a channel stay-in period, and causing the switch node to stay in the selected one of the channels for a duration of the channel stay-in period.

2. The channel utilizing method as claimed in claim 1, wherein the channel weight set includes a plurality of channel weights, each of which corresponds to a respective one of the channels.

3. The channel utilizing method as claimed in claim 2, wherein the current state changes among a start state, a stay-in state, a left state, and an end state.

4. The channel utilizing method as claimed in claim 3, wherein the channel weight corresponding to one of the channels is relatively large when traffic in said one of the channels is relatively heavy, and the time the switch node stays in the left state is relatively long.

5. The channel utilizing method as claimed in claim 2, wherein, in the step of calculating the channel weight set and selecting one of the (M) channels, the channel corresponding to a largest one of the channel weights is selected.

6. The channel utilizing method as claimed in claim 1, wherein, when the relation between the switch node and the neighbor node is such that the switch node and the neighbor node are included in a mesh network, and the switch node is a mesh point and supports a power-saving mechanism, the notify mechanism is determined to be the power-saving mechanism.

7. The channel utilizing method as claimed in claim 1, wherein, when the relation between the switch node and the neighbor node is such that the switch node and the neighbor node are included in a basic service set of a fundamental infrastructure of the wireless network, and the switch node is an access point and supports a hybrid coordination function (HCF) controlled channel access (HCCA) mechanism, the notify mechanism is determined to be the HCCA mechanism.

8. The channel utilizing method as claimed in claim 1, wherein, when the relation between the switch node and the neighbor node is such that the switch node and the neighbor node are included in a mesh network, and the switch node is a mesh point and does not support a power-saving mechanism, the notify mechanism is determined to be a clear to send (CTS)-to-self mechanism.

9. The channel utilizing method as claimed in claim 1, wherein the channel stay-in period is calculated based upon a channel utilization rate, an amount of time the channel has been currently occupied by the switch node, and an amount of time the channel has been previously occupied by another node.

10. The channel utilizing method as claimed in claim 3, further comprising the step of: enabling the neighbor node to transmit data stored thereby to the switch node after the neighbor node has been notified that the current state of the switch node is the stay-in state.

11. The channel utilizing method as claimed in claim 3, further comprising the step of: enabling the neighbor node to temporarily store data to be transmitted to the switch node after the neighbor node has been notified that the current state of the switch node is the left state.

12. The channel utilizing method as claimed in claim 1, wherein the wireless network is an IEEE 802.11 wireless network.

13. A channel utilizing system for a wireless network, said channel utilizing system being adapted for channel selection by a wireless network device having a number (N) of transceivers in an environment with a number (M) of channels, wherein (N)<(M), said channel utilizing system comprising: a calculating unit comprising logic for calculating a channel weight set, and for calculating a channel stay-in period; a channel selecting unit comprising logic for selecting one of the (M) channels according to the channel weight set; a notify mechanism processing unit comprising logic including a notify mechanism selecting module and a notifying module, said notify mechanism selecting module selecting a notify mechanism according to a relation between the wireless network device and a second wireless network device, said notifying module using the notify mechanism to notify the second wireless network device of a current state of the wireless network device; and a control unit comprising logic for controlling the time the wireless network device stays in the selected one of the channels according to the channel stay-in period.

14. The channel utilizing system as claimed in claim 13, wherein the channel weight set includes a plurality of channel weights, each of which corresponds to a respective one of the channels.

15. The channel utilizing system as claimed in claim 14, wherein said control unit further controls the current state of the wireless network device to change among a start state, a stay-in state, a left state, and an end state.

16. The channel utilizing system as claimed in claim 15, wherein the channel weight corresponding to one of the channels is relatively large when traffic in said one of the channels is relatively heavy, and the time the wireless network device stays in the left state is relatively long.

17. The channel utilizing system as claimed in claim 14, wherein said channel selecting unit selects the channel corresponding to a largest one of the channel weights.

18. The channel utilizing system as claimed in claim 13, wherein said notify mechanism selecting module selects a power-saving mechanism as the notify mechanism.

19. The channel utilizing system as claimed in claim 13, wherein said notify mechanism selecting module selects a hybrid coordination function (HCF) controlled channel access (HCCA) mechanism as the notify mechanism.

20. The channel utilizing system as claimed in claim 13, wherein said notify mechanism selecting module selects a clear to send (CTS)-to-self mechanism as the notify mechanism.

* * * * *